United States Patent
Naccari et al.

(10) Patent No.: US 12,087,020 B2
(45) Date of Patent: Sep. 10, 2024

(54) IMAGE COMPRESSION METHOD AND APPARATUS

(71) Applicant: Synaptics Incorporated, San Jose, CA (US)

(72) Inventors: Matteo Naccari, London (GB); Scott Liam Ransom, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 320 days.

(21) Appl. No.: 17/475,853

(22) Filed: Sep. 15, 2021

(65) Prior Publication Data

US 2023/0078190 A1 Mar. 16, 2023

(51) Int. Cl.
*G06T 9/00* (2006.01)
*H04N 19/126* (2014.01)
(Continued)

(52) U.S. Cl.
CPC ............. *G06T 9/00* (2013.01); *H04N 19/126* (2014.11); *H04N 19/146* (2014.11); *H04N 19/172* (2014.11); *H04N 19/184* (2014.11)

(58) Field of Classification Search
CPC ...... G06T 9/00; H04N 19/115; H04N 19/124; H04N 19/126; H04N 19/146;
(Continued)

(56) References Cited

U.S. PATENT DOCUMENTS 5,590,064 A 12/1996 Astle
5,623,424 A * 4/1997 Azadegan ............... H04N 7/52
375/E7.235

(Continued)

FOREIGN PATENT DOCUMENTS

EP 2169962 A1 3/2010
JP 2002232721 A 8/2002
WO 2000018137 A1 3/2000

OTHER PUBLICATIONS

Marzuki et al. "Tile-level rate control for tile-parallelization HEVC encoders." Journal of Real-Time Image Processing 16 (2019): 2107-2125. (Year: 2019).*

(Continued)

*Primary Examiner* — Katrina R Fujita
(74) *Attorney, Agent, or Firm* — Paradice & Li LLP

(57) ABSTRACT

Systems and methods for controlling compression of image data by a quality controller include obtaining a desired target number of bits to be generated from compression of a current image area using a predetermined compression protocol, determining a calculated quantisation level based on the desired number of bits using a predetermined relationship between the number of bits and quantisation level, selecting a discrete quantisation level from a plurality of predetermined discrete quantisation levels based on the calculated quantisation level, determining a predicted number of bits that would result from compression of the current image area at the selected discrete quantisation level using the predetermined relationship, determining whether the predicted number of bits exceeds the desired number of bits and, if not, providing to an encoder information to enable the encoder to determine a set of compression parameters associated with the selected discrete quantisation level.

12 Claims, 10 Drawing Sheets

(51) Int. Cl.
*H04N 19/146* (2014.01)
*H04N 19/172* (2014.01)
*H04N 19/184* (2014.01)

(58) Field of Classification Search
CPC .... H04N 19/147; H04N 19/15; H04N 19/172; H04N 19/176; H04N 19/184; H04N 19/19; H04N 19/436
See application file for complete search history.

(56) References Cited

U.S. PATENT DOCUMENTS

| | | | | |
|---|---|---|---|---|
| 5,768,436 | A * | 6/1998 | Keesman | H04N 19/176 |
| | | | | 375/E7.157 |
| 6,668,088 | B1 * | 12/2003 | Werner | H04N 19/40 |
| | | | | 375/240.03 |
| 7,418,037 | B1 * | 8/2008 | Nie | H04N 19/14 |
| | | | | 375/240.03 |
| 2006/0056508 | A1 * | 3/2006 | Lafon | H04N 19/124 |
| | | | | 375/E7.14 |
| 2007/0147500 | A1 * | 6/2007 | Chono | H04N 19/573 |
| | | | | 375/E7.262 |
| 2013/0251031 | A1 * | 9/2013 | Yitschak | H04N 19/126 |
| | | | | 375/240.03 |
| 2015/0215621 | A1 * | 7/2015 | Liu | H04N 19/124 |
| | | | | 375/240.03 |
| 2015/0288965 | A1 * | 10/2015 | Li | H04N 19/124 |
| | | | | 375/240.03 |
| 2017/0295368 | A1 * | 10/2017 | Teng | H04N 19/172 |
| 2019/0166180 | A1 * | 5/2019 | Zhao | H04N 19/126 |
| 2021/0037252 | A1 * | 2/2021 | Nagori | H04N 19/152 |

OTHER PUBLICATIONS

Li et al., "λ Domain Rate Control Algorithm for High Efficiency Video Coding," IEEE Transactions on Image Processing, vol. 23, No. 9, pp. 3841-3854, Sep. 2014.

Rosewarne et al., "High Efficiency Video Coding (HEVC) Test Model 16 (HM 16) Encoder Description Update 9," JCTVC-AB1002, 28th meeting of the Joint Collaborative Team on Video Coding (JCT-VC), Turin, IT, Jul. 2015, (relevant pp. 55-61).

Sullivan et al., "Rate Distortion Optimization for Video Compression", IEEE Signal Processing Magazine, vol. 15, No. 6, pp. 74-90, Nov. 1998.

Yu et al., "A New Rate Control Algorithm for MPEG-4 Video Coding," In Visual Communications and Image Processing 2002 (vol. 4671, pp. 698-709). International Society for Optics and Photonics. (Jan. 2002).

Combined Search and Examination Report, dated Mar. 21, 2023, from UK Patent Application No. GB2213345.8, pp. 1-7.

Combined Search and Examination Report, dated Mar. 13, 2024, from UK Patent Application No. GB2313604.7, pp. 1-4.

Combined Search and Examination Report, dated Mar. 22, 2024, from UK Patent Application No. GB2313612.0, pp. 1-4.

Marzuki, I., Ahn, YJ. & Sim, D., "Tile-Level Rate Control for Tile-Parallelization HEVC Encoders," J Real-Time Image Proc 16, 2107-2125 (2019). https://doi.org/10.1007/s11554-017-0720-5 (pp. 1-12).

* cited by examiner

IMAGE COMPRESSION METHOD AND APPARATUS

FIELD

The present invention relates to methods and apparatus for compression of image data.

BACKGROUND

Image data is often compressed before being transmitted over a bandwidth limited connection, such as over a wireless connection. In many scenarios, such as virtual or enhanced reality, videoconferencing, docking and screen sharing in gaming, a large amount of image data may need to be transmitted and the bandwidth may be insufficient for uncompressed image data to be transmitted. Even compressed image data may need to be controlled in order to try to reduce the amount of compressed image data so that it will meet the constraints associated with the available bandwidth for a particular scenario. For example, in virtual reality applications, large numbers of frames of image data may need to be transmitted, if an image being displayed is changing rapidly, for example due to a person's head movement.

There are a number of known compression protocols, which can be adjusted to have different levels of compression. A high compression level will mean that the image data is highly compressed, will take up less bandwidth to transmit but will therefore potentially lose more detail, whereas a low compression level is one where the image data is only slightly compressed, will take up more bandwidth, but will maintain more detail. Compression of image data may take place over a whole frame uniformly, or over only portions of the frame, and different portions may be compressed (or not) at different levels with different protocols. It will be assumed hereinafter that compression may include a compression level of zero, meaning that no compression is applied, but will be considered as compression for ease of understanding.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method of controlling compression of image data by a quality controller is disclosed. The method may involve setting a desired target number of bits $R_{desired}$ to be generated from compression of a current image area, determining a calculated quantisation level $\Delta_{desired}$ based on $R_{desired}$ using a predetermined relationship between R and $\Delta$, and selecting a discrete quantisation level $\Delta_{selected}$ from a plurality of predetermined discrete quantisation levels $\Delta$ based on the calculated quantisation level $\Delta_{desired}$. The method may then determine a predicted number of bits $R_{predicted}$ that would result from compression of the current image area at the selected discrete quantisation level $\Delta_{selected}$ using the predetermined relationship between R and $\Delta$. A comparison is made to determine whether $R_{predicted}$ exceeds $R_{desired}$. When $R_{predicted}$ exceeds $R_{desired}$, then $R_{desired}$ is reduced. Setting $R_{desired}$, determining $\Delta_{desired}$, selecting $\Delta_{selected}$, determining $R_{predicted}$, and determining whether $R_{predicted}$ exceeds $R_{desired}$ may then be repeated until $R_{predicted}$ does not exceed $R_{desired}$. An indication of the selected discrete quantisation level $\Delta_{selected}$ determined at the last repetition is then provided to an encoder, the indication enabling the encoder to determine compression parameters associated with the selected discrete quantisation level $\Delta_{selected}$ for compressing the current image area using a predetermined compression protocol. The set of compression parameters may be determined from a plurality of sets of compression parameters each associated with a respective one of the plurality of predetermined discrete quantisation levels $\Delta$. The image area may comprise any one of an image frame, a part of an image frame, or a part of an image that extends across a plurality of display panels.

Another method of controlling compression of image data is also disclosed, in which a quality controller determines a weight $W_{current}$ for each current image area of a plurality of current image areas forming a current image frame, the weight $W_{current}$ to be used to determine a desired target number of bits $R_{desired}$ to be generated from compression of the corresponding current image area. Determining the weight $W_{current}$ may comprise normalising an actual number of bits $R_{actual}$ generated from compression of a corresponding previous image area in a previous image frame by the actual total number of bits $R_{TOTAL}$ generated from compression of the previous image frame to produce a normalised number of bits $R_{normal}$ for each image area. A normalised weight $W_N$ is then determined for each image area from the normalised number of bits $R_{normal}$ for the corresponding image area in one or more previous image frames. For each image area, the normalised weight $W_N$ is combined with a weight $W_P$ previously used for the corresponding image area in the previous image frame so as to provide the weight $W_{current}$ to be used to determine the desired target number of bits $R_{desired}$ to be generated from compression of the corresponding image area of the current image frame.

A further method of controlling compression of image data is also disclosed, in which a quality controller selects a discrete quantisation level $\Delta_{frame}$ from a plurality of predetermined discrete quantisation levels $\Delta$ for compression of a current image frame. For each image area of a plurality of previous image areas forming a previous image frame, a discrete quantisation level $\Delta_{area}$ of the plurality of predetermined discrete quantisation levels $\Delta$ that was used for compression of each of the previous image areas is determined. An average value $\Delta_{average}$ of the discrete quantisation levels $\Delta_{area}$ used for compression of all of the previous image areas of the previous image frame for one or more previous image frames is determined, and an updated discrete quantisation level $\Delta_{updated}$ for the current image frame from the average value $\Delta_{average}$ for the one or more previous image frames and the discrete quantisation level $\Delta_{frame}$ selected for the current image frame is determined. An indication of the updated discrete quantisation level $\Delta_{updated}$ is provided to an encoder, the indication enabling the encoder to determine compression parameters associated with the updated discrete quantisation level $\Delta_{updated}$ for compressing the current image frame using a predetermined compression protocol. The set of compression parameters may be determined from a plurality of sets of compression parameters each associated with a respective one of the plurality of predetermined discrete quantisation levels $\Delta$.

BRIEF DESCRIPTION OF THE DRAWINGS

The present embodiments are illustrated by way of example and are not intended to be limited by the figures of the accompanying drawings, of which.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

Figure 1:
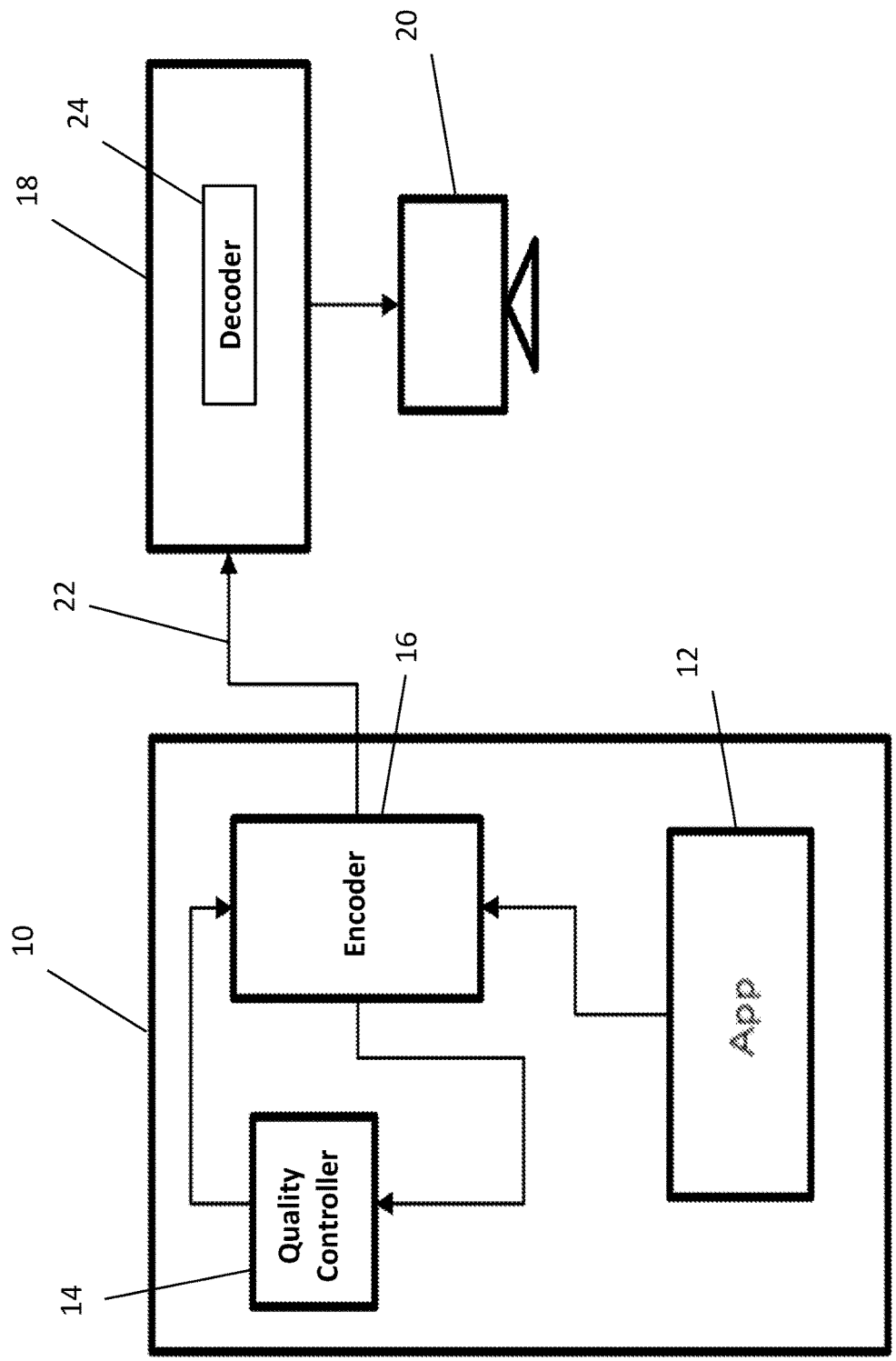
FIG. 1 is a schematic diagram of a system that may utilise image compression.

As shown in FIG. 1, a video compression system includes a host device 10, which generates video images, compresses the video images, and transmits the compressed image data to a client device 18, which decompresses the received compressed image data, processes it as required, and sends it to a display device 20 for display. The video system may be a virtual or enhanced reality system, where the host device sends the image data to virtual or enhanced reality wearable glasses or other head-mounted display system, a videoconferencing system, where the host device may be receiving and/or generating combined video feeds from video cameras and transmitting them for display in video conferencing rooms, docking systems, where the host device may be generating the video image data and transmitting it wirelessly to a display device, or a screen sharing system in gaming environment, where the host device may be combining and sharing image data from a number of users and transmitting the image data to one or more display systems at one or more different locations. Thus, the host device 10 may include an application 12, which may be running on a processor, that generates image data. The host device may have one or more processors, which may be general purpose processors, graphics processors or other dedicated processors performing various functions in the host device. The application 12 may be creating the image data itself, or may be collating or combining image data from other sources (not shown).

For example, in the context of video conferencing the sources may be cameras and/or video streams from remote locations. There may be different types of image data. For example, image data may be frames of images, such as a movie, or may be still images, such as photographs or other pictures, or may be images of documents that are in the process of being created, for example from a word processing or other applications, or may be video gaming images. The image data may be formed of a number of windows, which may have one or more different types of image data in each window. Therefore, a frame of image data may have different types of image data in different areas of the frame, for example in different windows. Indeed, a window may have different types of image data within it.

The image data, of whatever type, or combination types, is passed to an encoder 16 for compression. Herein it will be assumed that "encoding" and "compressing" are the same, and either term may be used interchangeably. It is appreciated, that encoding may sometimes encompass encryption or other forms of encoding, but, as used herein, it will be intended to mean compressing. Compression of data, including image data, is performed by the encoder 16 in order to reduce the amount of data, i.e. the number of bits, that needs to be transmitted from the host device 10 to a client device 18 for display on a display device 20. The display device 20 may be one of two or more display devices (not shown) connected to receive a single image that extends over two or more such display devices. The transmission may need to be made across a bandwidth limited connection 22, whether wired or wireless. The bandwidth may be limited because of inherent limitation in the connection, because a number of different entities are transmitting across a shared connection at the same time, because the connection is unstable, or for any number of other reasons. Furthermore, the client device 18 may be limited in the amount of processing it can do in the time available, especially if the video is fast changing, for example in a video reality or gaming environment.

Therefore, there may be a number of different reasons why the amount of data to be transmitted should be limited. Of course, limiting the number of bits that can be used to transmit an image means that the image will lose at least some quality. The larger the number of available bits (the higher the bandwidth), the higher the quality and the lower the compression level. By adjusting the quality level, or the bit rate, at which the encoder 16 outputs the encoded image, the amount of data (the number of bits) can be controlled according to the available resources for transmission and/or decoding/display. Ideally, the quality level would be as high as possible (the lowest compression level) whilst still outputting from the encoder the bits at a rate below a maximum number that can be transmitted and/or decoded/displayed at the client device.

The client device 18, as shown, includes a decoder 24 and other circuitry for receiving the compressed data, for decoding it and for outputting it to the display device 20 in an appropriate format and rate for display. It will be appreciated that other circuitry may be, indeed is likely to be, present in the client device, but is not relevant for the purposes of the present invention. Furthermore, it will also be appreciated that the display device 20 may be separate from the client device 18, or may be integrated with it.

As mentioned, in order to achieve the highest quality for a particular number of bits transmitted from the host device 10, it is desirable to control the compression performed by the encoder 16. When a maximum desirable bit rate output from the encoder is known, the compression level of the encoder may be controlled to have an output bit rate that is no higher than the maximum desirable output bit rate. In an embodiment, the encoder 16 is controlled by a quality controller (or rate controller) 14. The bit rate of the encoder 16 is the number of bits per pixel of the image that are output from the encoder to provide the compressed image data. The compression level may be controlled by the quality controller 14 to be a particular compression level for an entire frame, or sequence of frames, or may be adjusted on a frame-by-frame basis. The compression level may be adjusted, additionally or alternatively, for different areas within a frame. Thus, different types of image data may be compressed at different levels. For example, grayscale documents may be compressed at a higher level without losing much information, when decompressed and displayed, as compared to high definition photographs or video. Even within a photograph or a video, different areas of the image may be compressed at different levels. For example, a larger area of similar, or identical color, such as sky, may be compressed at a higher level, without losing quality perceived by a viewer of the display device 20, than an area with sharp boundaries between different colors providing high detail. Furthermore, different types of image data, or different areas of the same type of image data, may be compressed using different compression algorithms (or protocols), as different compression protocols are more suited to compressing particular types of image data. Each compression protocol uses different compression parameters to achieve compression at particular levels. An image area may, therefore, encompass a complete image, such as an image frame, which may be one of a sequence of images, which may, in some cases form a video. Image areas could, for example, be parts of an image that include the same or similar types of image data, for example, video, photo, text, etc. An image area may, in some cases, encompass a portion of a complete image. The portion may be a tile, when the image is divided into tiles, or a group of tiles. A tile group may have any number of tiles and may be of any shape, for example a square 8×8 group of tiles, or any other shape and number of tiles, such as a rectangle of 2×8 tiles. The portion may be an area of the image bounded by sharp boundaries in the image so that the portion may be of any shape, with boundaries determined, for example using edge detection techniques, or the portion may be determined in other ways. Furthermore, the image may be one that is extended across two or more display panels and an image area may be that portion to be displayed in one of the two or more display panels.

Although the application 12, quality controller 14 and encoder 16 have been described and are shown in FIG. 1 as forming part of the host device 10, it will be appreciated that each of these may be separate modules and may be present in separate devices. For example, the application 12 may be a separate mobile device, which may be connected to a docking station having the encoder 16. The quality controller 14 may be separate from the docking station, i.e. the encoder 16 and may be at a central location to control a number of separate docking stations. Thus, any of the application (application generating processing elements) 12, quality controller 14 and encoder 16 may be co-located in a single device, or may be separate modules in other devices, or independent devices.

In many cases, an encoder may have a number of different compression protocols available to select from, each with a number of compression levels available choose from. Each chosen compression level has a number of compression parameters predefined for that particular compression level to be used for encoding/compression of the particular area of the image that is to be compressed using the selected compression protocol at the chosen compression level. Although compression protocols and compression levels are not the same thing, as the compression level chosen for any particular compression protocol must be controlled to produce the appropriate bit rate, the rest of the disclosure will refer to control of compression levels, although it should be understood, that selection of a compression level may include selection of a compression protocol and of a compression level for that compression protocol.

Of course, different encoders may have different compression protocols (or just one) available. It is known that a relation between a number of bits output from the encoder (the bit rate) is related to a quality level via a parameter known as the Lagrange multiplier ($\lambda$). In general, a known relation between the bit rate R for a codec compliant with a hybrid motion compensated predictive codec, such as the one specified by the H.265/HEVC standard is:

$$\lambda = \alpha \cdot R^\beta \quad (1)$$

where R is the coding rate measured in bits per pixel (BPP) and $\alpha$ and $\beta$ are variables depending on the predetermined compression protocol and the image data to be compressed and a Quality factor $Q_F$ is given by:

$$Q_F = Q(\lambda) \quad (2)$$

The present inventors have found, however, that for some encoders, for example one made by DisplayLink (UK) Limited in the United Kingdom, the relation between the Lagrange multiplier ($\lambda$) and the bit rate R is more accurate based on the following relation:

$$\lambda = \alpha \cdot \beta \cdot 2^{\beta \cdot R} \quad (3)$$

and the relation between the compression level $\Delta$ (related to the quality as discussed above) is based on:

$$\Delta = a \cdot \lambda^b + c \quad (4)$$

where a, b and c are experimental values determined for the particular compression protocol. For the DisplayLink encoder mentioned above, this equation becomes:

$$\Delta(\lambda) = 3.24 \cdot \lambda^{0.47} + 1.6 \quad (4a)$$

the values of a, b and c having been found experimentally for a particular encoder running a particular compression protocol for particular frames of image data. They may be updated whenever any of these circumstances changes, and the updating may be done dynamically, when updated values can be determined from the changed circumstances.

In an embodiment, therefore, there is provided a method of determining compression parameters for compressing image data, the method comprising:

determining a target bit rate R for an encoder to output after compressing image data forming an area of an image using a predetermined compression protocol;

determining a Lagrange multiplier ($\lambda$) from the target bit rate based on the following relation:

$$\lambda = \alpha \cdot \beta \cdot 2^{-\beta \cdot R} \quad (3)$$

where R is the target coding rate measured in bits per pixel (BPP) and $\alpha$ and $\beta$ are variables dependent on the predetermined compression protocol and the image data to be compressed;

determining a compression level Δ for the predetermined compression protocol based on the following relation:

$$\Delta = a \cdot \lambda^b + c \quad (4)$$

where a, b and c are experimental values determined for the predetermined compression protocol; and determining compression parameters to be used by the encoder in performing the predetermined compression protocol from a mapping of compression levels to compression parameters based on the determined compression level Δ.

In order, therefore, to control the bit rate output from the encoder 16, the quality controller 14 is used to determine the compression level Δ that is to be applied by the encoder 16 and provides an indication to the encoder as to what compression level Δ is to be used. In some embodiments, the encoder 16 has a number of predetermined, discrete, compression levels Δ, for example 256 different compression levels Δ, which are stored in a table, together with compression parameters that are to be used for each compression level Δ. Some compression protocols specify quantisation using tables each containing a different divisor for each class of transform coefficients. In the software on the host device, the default process to generate the quantisation tables maps each set of divisors to a given quality factor ($Q_T$) in the range 0-255 inclusive. As an example, the following table shows an example of compression parameters associated with a specific value of $\Delta_{selected}$ of 7.925. The ten values listed under "compression parameters" constitute a set of divisors used to reduce the accuracy of representation for transform coefficients for transformation of the pixel information of the image data, hence reducing the number of bits needed to encode a given image area. Each divisor can be either applied to a single transform coefficient or to a multiple of them, depending on the quantisation rules specified in the compression protocol. The division of each transform coefficients by its associated compression parameter (divisor) will result in a quotient represented using integer precision. Such a quotient is then encoded with a given number of bits specified in the compression protocol.

| $\Delta_{selected}$ | Compression parameters | | | | | | | | | |
|---|---|---|---|---|---|---|---|---|---|---|
| 7.925 | 27 | 59 | 59 | 117 | 23 | 23 | 46 | 12 | 12 | 23 |

Although the quality controller 14 could simply send the value of 7.925 to the encoder, in some embodiments, it may be easier to simply send an indication of the compression level Δ to be used. This could be an index number for that compression level Δ in the table. There would therefore be 256 possible index numbers from 0-255 for the example of 256 different discrete compression levels Δ mentioned above. In such a case sending a value between 0-255 may be easier than sending the actual compression level Δ value of 7.925, for example. Such an index number may be considered to be a quality factor $Q_T$ as it provides an indication of the compression level Δ to be used, i.e. the quality of the compressed image data.

Figure 2:
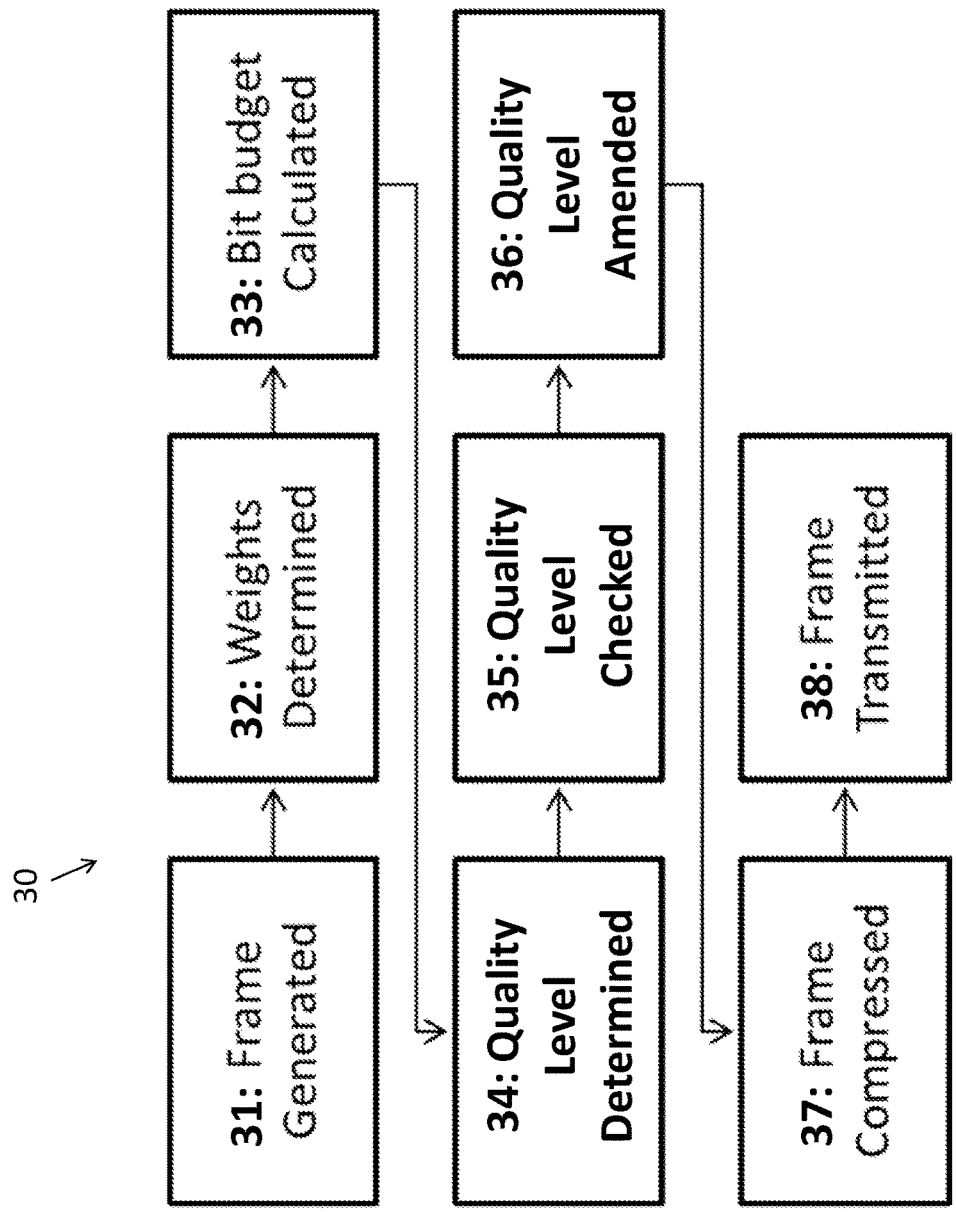
FIG. 2 shows, schematically, one process for controlling a compression level to be used in the system of FIG. 1.

An overview of the method 30 may be considered with reference to FIG. 2. In this case, an image frame is generated 31 by the application 12. In some cases, the compression to be used is determined for the whole of the image frame. In other cases, different image areas of the frame may be considered separately and different compression levels could be used for different image areas. In such cases, optionally, different image areas may be weighted 32, for example based on the type of image data, or as described below. As will be described below, the bit budget to be used for encoding of the image frame or image area is then determined 33, optionally based on the weight, if that has been determined. An appropriate quality level (that is, compression level), is then determined 34 based on the bit budget, checked 35 to see whether it will provide a number of bits of the encoded image frame or area that is below the bit budget, and then adjusted 36, if necessary, as will be further described below. The frame (or image area) is then compressed (encoded) 37 and transmitted 38 to the client device.

Figure 3:
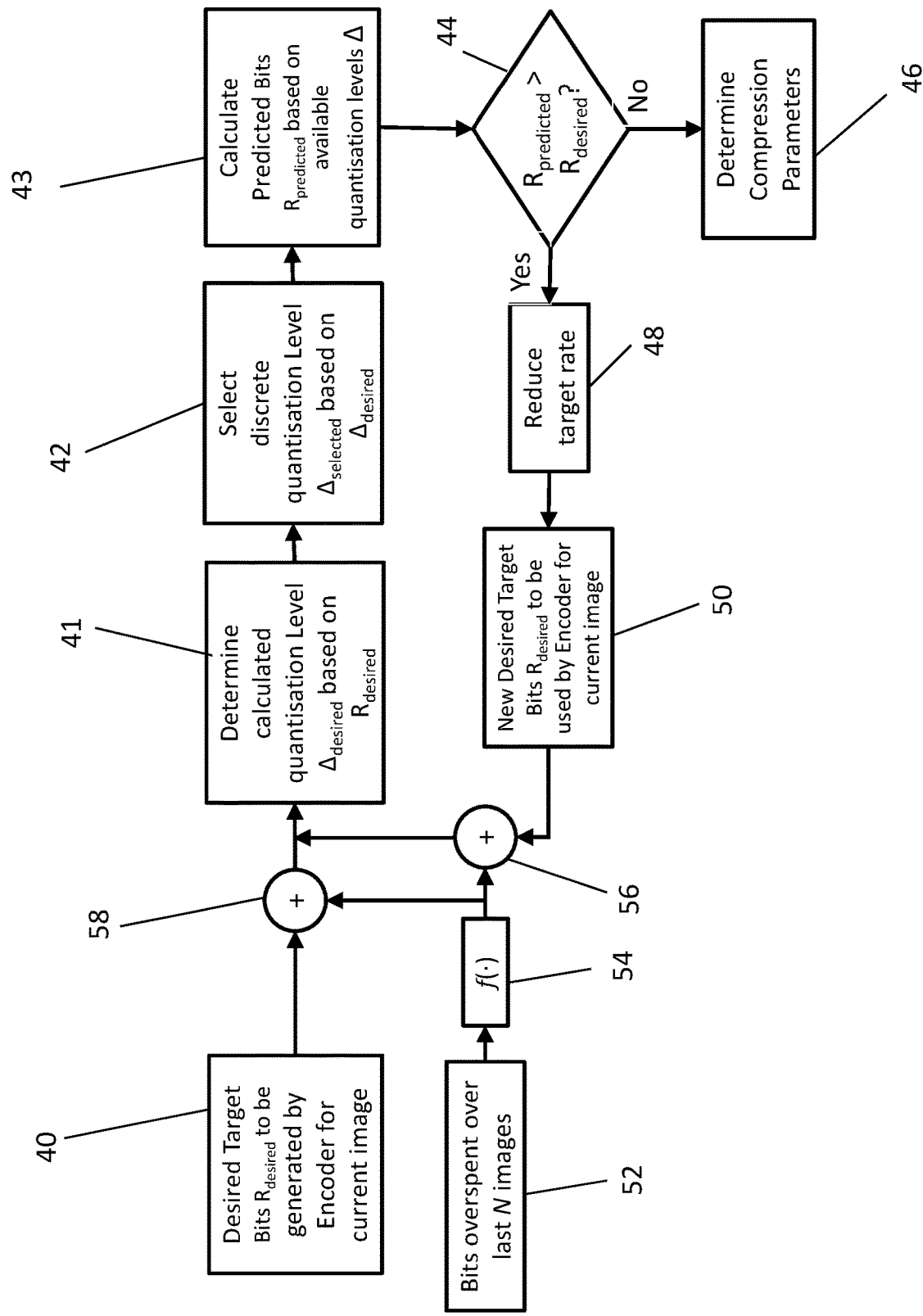
FIG. 3 is a flow diagram of a compression control method that may be used in the system of FIG. 1.

In embodiments, in order to determine the compression level Δ to be used, the quality controller 14 obtains an indication of the number of bits that are available (or are likely to be available) for transmission of a particular area (or the whole of) the image (possible, an image frame). With reference to FIG. 3, the quality controller 14 sets this received available number of bits, i.e. the target number of bits, as a desired target number of bits $R_{desired}$ to be generated 40 from compression of a current image area by the encoder 16. The quality controller 14 may base the desired target number of bits $R_{desired}$ based on various parameters or qualities, as will be described further below. The quality controller 14 then determines 41 a calculated quantisation level $\Delta_{desired}$ based on $R_{desired}$ using a predetermined relationship between R and Δ. This may be relations (3) and (4) discussed above. From the calculated quantisation level $\Delta_{desired}$, the quality controller 14 selects 42 one of the discrete quantisation levels $\Delta_{selected}$ from the plurality of predetermined discrete quantisation levels Δ that is nearest the calculated quantisation level $\Delta_{desired}$. It will be appreciated that the quality controller 14 has access to a table, similar to that of the encoder 16, that includes the listing of the plurality of possible predetermined discrete compression levels Δ that are available be used, together with the corresponding index numbers for the discrete compression levels Δ, identical to those in the table in the encoder 16, although the quality controller 14 does not need to have the corresponding compression parameters. Of course, depending on the particular implementation, it is possible for the table to be shared between the quality controller 14 and the encoder 16, whether the table is stored in the quality controller 14, the encoder 16, or in some other memory to which the quality controller 14 and the encoder 16 have access. Given that the calculated quantisation level $\Delta_{desired}$ may have any value on a continuum of values, the selected discrete quantisation level $\Delta_{selected}$ is likely to be close but not identical to the calculated quantisation level $\Delta_{desired}$. Selection of the "nearest" discrete quantisation level $\Delta_{selected}$ may be made according to different algorithms. It may be based simply on the closest actual value, or may be the closest lower or closest higher value or any combination of these two latter values.

From the selected discrete quantisation level $\Delta_{selected}$ the quality controller 14 determines 43 a predicted number of bits $R_{predicted}$ that would result from compression of the current image area at the selected discrete quantisation level $\Delta_{selected}$ using the predetermined relationship between R and Δ. It will be apparent that the predicted number of bits $R_{predicted}$ will not be the same as the desired target number of bits $R_{desired}$ because of the difference between the calculated quantisation level $\Delta_{desired}$ and the selected discrete quantisation level $\Delta_{selected}$. The quality controller 14 then determines 44 whether $R_{predicted}$ exceeds $R_{desired}$. When $R_{predicted}$ exceeds $R_{desired}$, then the quality controller 14 reduces 48 $R_{desired}$ to a new value of $R_{desired}$ by a given amount 50 and performs the steps of calculating 41 a new calculated quantisation level $\Delta_{desired}$, selecting 42 a new discrete quantisation level $\Delta_{selected}$, determining 43 a new predicted number of bits $R_{predicted}$ that would result from compression of the current image area at the new selected discrete quantisation level $\Delta_{selected}$ and determining 44 whether $R_{predicted}$ exceeds $R_{desired}$. This process is repeated until the new $R_{predicted}$ does not exceed the new $R_{desired}$. Based on the new selected discrete quantisation level $\Delta_{selected}$ the quality controller 14 looks up the corresponding index number in the table and provides the index number of the selected discrete quantisation level $\Delta_{selected}$ to the encoder 16. Of course, if desired, the actual value of the selected discrete quantisation level $\Delta_{selected}$ could be provided instead. The encoder 16 is then able to determine 46 compression parameters associated with the selected discrete quantisation level $\Delta_{selected}$ for compressing the current image area from the table at the encoder 16. It should be noted that, despite the R-λ relation, i.e. as in equation (3) above, being the same for frame and tile group, its parameters, i.e. α and β in equation (3), are stored on a per frame and tile group basis: this is to guarantee content adaptation at both frame and tile group level.

Of course, given the varying parameters of actual images, using the compression parameters determined above may still result, in some instances, in the actual number of bits R output from the encoder for a particular image area. Accordingly, the predicted number of bits $R_{predicted}$ does not always reflect the actual one, with the final result being that the encoder may produce a number of bits which is above the maximum allowed for the particular image area. In order to minimize such occurrences, the quality controller 14 can be provided with a store 52 of actual numbers of bits that were output by the encoder for previous image areas/frames and a guard tolerance interval can be computed based on this historical data. The quality controller 14 determines a difference 54 between the actual number of bits output in a predetermined number of previous image areas/frames (or an average from a number of previous image areas/frames) and the desired target number of bits previously set for the predetermined number of previous corresponding image areas/frames. In an example, the average may be the arithmetic mean of all excesses that happened in the last N image areas frames. In another example such a mean can weight each excess based on its temporal distance from the current image area/frame. The quality controller 14 then combines 56 the difference with the predicted number of bits $R_{predicted}$ as calculated from the selected discrete quantisation level to produce an updated $R_{predicted}$. This updated $R_{predicted}$ is then used in the comparison with $R_{desired}$. Alternatively, if no iterations have yet taken place, the quality controller 14 may combine 58 the difference with the desired target number of bits $R_{desired}$. Therefore if compression of previous image areas/frames actually output fewer bits than were available, the "excess" bits could be added to be used in the present image area/frame, whereas if compression of previous image areas/frames actually output more bits than were supposed to be available, then the number of bits to be used for the present image area/frame could be reduced, so that the overall total number of bits used may be closer to the available bandwidth for an aggregate number of image areas/frames. By using a larger number of previous (historic) excesses, the method is more conservative and reduces the number of image areas/frames above the limit, whereas using a smaller number of previous excesses (i.e. more recent ones), the method is more reactive to changes.

As mentioned above, the quality controller 14 first sets the available number of bits as a desired target number of bits $R_{desired}$ to be generated from compression of a current image area. Although it may seem that the rate allocation for a frame is simply a division of the target bandwidth (usually measured in Megabits per second) by the content's frame rate and pixel count to obtain the bits per pixel as required by equation (3). However, there are some fixed bits associated with headers and transport layer metadata which needs to be discounted since the R-λ relation will only be able to control the bits associated with compressed pixels. Moreover, in some cases, some tile groups will be compressed with a fixed quality, resulting in a number of coding bits which cannot be controlled by the R-λ relation. Therefore, these bits need to be discounted from the total budget and the remaining rate will also be scaled to account for the different complexity of the tile groups controlled by the R-λ relation.

The process for choosing the frame's target coding rate and quality can, in some examples, be expressed according to the following sequence of ordered steps.
1. The available bandwidth expressed in Mbps ($10^6$ bits per second) is passed to the quality controller and is scaled down to account for any additional data to be sent (e.g. transport layer metadata). The scaling is done as a preventative measure to reduce the chance that a frame overspends due to any unforeseen additional data being sent. The scaling factor may be set to 0.99 by default.
2. The scaled down bandwidth is then converted into bits by dividing it by the current frames per second the encoder is running at. This gives the total target bits for the frame, but not the target that the quality controller will work with. In fact, some compression protocols provide some headers at both frame and tile group level whose payloads need to be subtracted so that the quality controller will have a more accurate bit budget figure.
3. The desired target number of bits $R_{desired}$ for the frame is then calculated by subtracting all compulsory bits that must be sent this frame from the total target bits for the frame. Each tile group in some compression protocols has a header which contains a number of different elements, some of which are fixed in size, for example, a total size of 144 bits. Additionally, other blocks (tiles) may need to be sent for a variety of purposes without compression. Accordingly, the target number of bits $R_{desired}$ for the frame is equal to the total number of bits available less the number of bits required for headers and uncompressed or other fixed tiles.

The above method, although controlling the overall number of bits output from the encoder to maximise quality for a given available bandwidth, produces a similar compression level for each image area/frame for a given available bandwidth. However, sometimes an image may have image areas that are difficult to compress, or are more important, for whatever reason (perhaps having more complicated detail), than others. In this scenario, it would be useful to be able to alter the number of bits available for different image areas so that some areas may be allowed more bits and other areas fewer bits.

It is therefore proposed that the target coding rate for a tile group or other image area is set on the fly and is dependent on the tile groups or image areas that have already been encoded within the frame. Given the varying statistics of image pixels across the frame, each tile group (image area) will have a different rate share allocated on the basis of how difficult it is to compress. The quality controller therefore has to decide the quality factor (determined compression level Δ) for a given image area so that areas that are difficult to compress will receive a larger number of bits, resulting in a higher quality. The overall effect of this uneven spread of the bit budget is an improved perceived quality. To determine which image areas will receive more bits the coding bits spent on each image area are normalised by the total bits spent on the entire image. These normalised bits become weights which can be used to determine the number of bits to spend on the current image area as a proportional share of the total.

Figure 4:
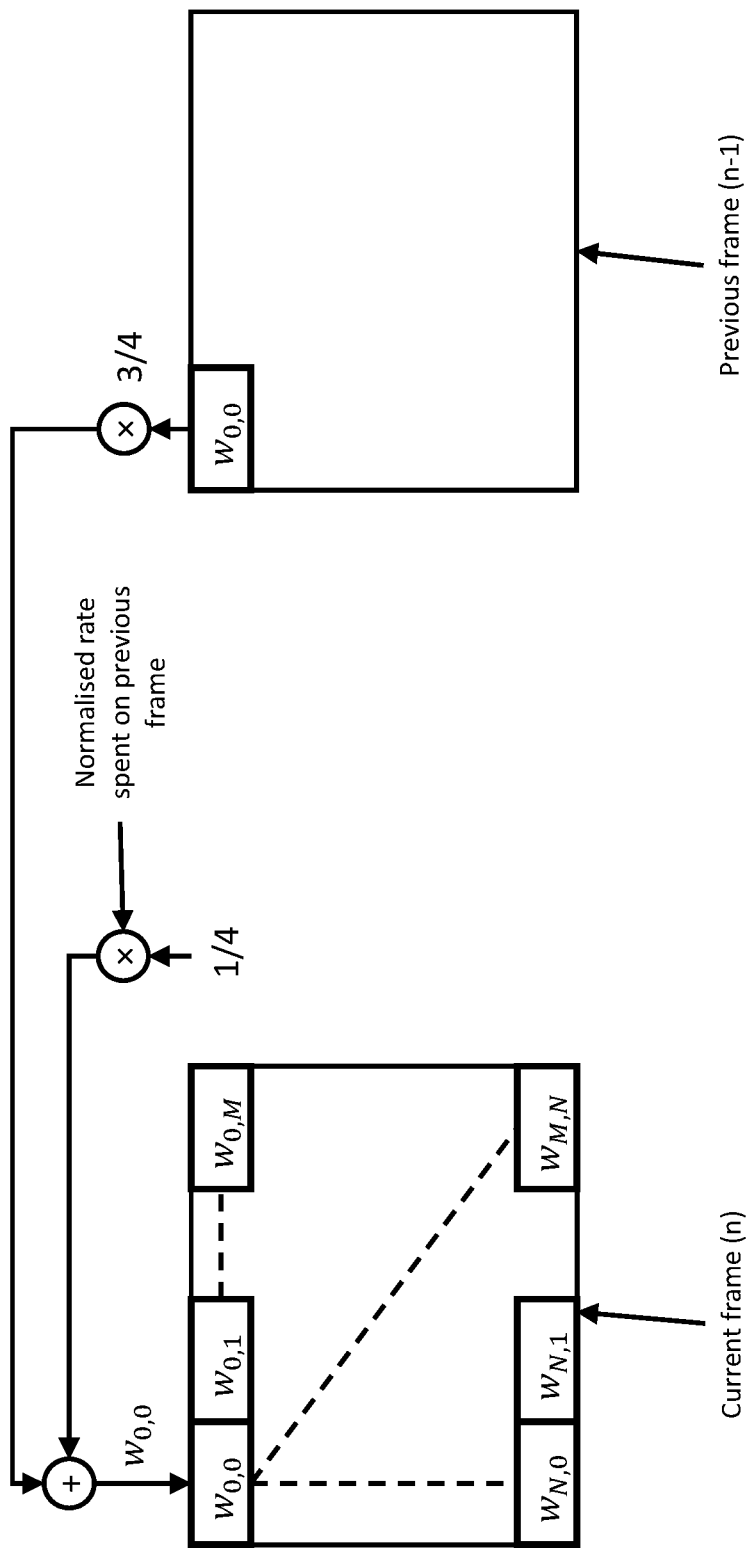
FIG. 4 shows, schematically, another process for controlling a compression level to be used in the system of FIG. 1.

Accordingly, with reference to FIG. 4, for each image area in a current image frame (n), a weight from the same area in a previously encoded image frame (n−1) is combined with a normalised number of bits spent on a previous encode of this area. As shown, the current image frame (n) is divided into an N×M grid of areas, with N+1 rows and M+1 columns. Each area has a weight $W_{x,y}$. For the purposes of this example, weights are given on a scale of 1-4 where 4 is associated with tiles (or image areas) which are more complex to compress. In this way, any sudden change in the bit distribution across frames is attenuated by combining more historical information. However, the weights may be provided on a smaller or larger scale, as desired. In the particular example of FIG. 4, referring to the area in the top-left hand corner, with four possible weights, the weight for the current frame is determined, based on equation (5) below, as:

$$W_{0,0\ current} = \tfrac{1}{4} W_{0,0\ normalised} + \tfrac{3}{4} W_{0,0\ previous}$$

where the fractions ¼ and ¾ add up to 1 and the denominator may correspond to the number of weights in the scale.

It will be understood that if, for a given image area in a given frame, an object traverses the scene, the bits spent for that specific frame may be higher (or lower) than what is expected when looking over a large set of images. This difference in the distribution may lead to a lower accuracy of the quality (rate) control given that it will then have to compensate for a short swing in the rate allocation that happened on a single frame. Weighting the bits spent over more frames would have the benefit of filtering out these outliers.

Figure 5:
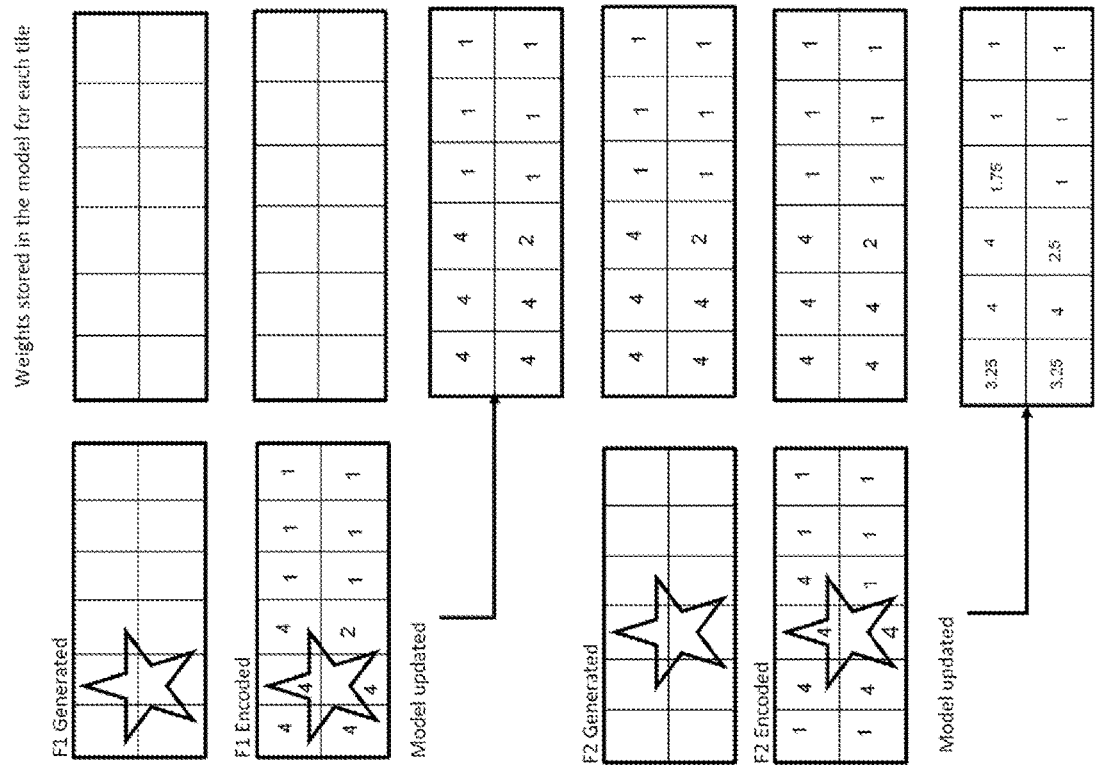
FIG. 5 shows a more detailed example of the process of FIG. 4.

An example of these weights (prior to normalisation) and how they can be altered is shown in FIG. 5, which shows two frames divided into tiles and the weights that the process in the quality controller stores for those tiles to be used during encoding. As shown, Frame F1 is generated with a star at the far-left side. At this stage, a model in the quality controller 14 has an initial set of weights which may be all the same and this is represented by no weights being stored in the quality controller 14. Frame F1 is then encoded and the actual weights of the tiles are determined by dividing the bits required for a tile group after encoding by the total number of bits used for the entire frame—this is indicated by labels on the tiles on the scale of 1-4, as previously described. After encoding, frame F1 is transmitted for display and the model is updated using the weights associated with the tiles comprising frame F1. These can then be used as a basis for the encoding of subsequent frames.

The following frame F2 is slightly different to F1 as the star shown in the image has moved to the right. This means that the bit budget required for each tile will actually have changed, but the system is not aware of this until after encoding. Encoding is carried out using the weights stored in the model, which were generated on the basis of the data in F1, to estimate what the bit budget for each tile will be, but the actual weights of the tiles are different due to the difference in display data. After frame F2 has been encoded, it is transmitted for display and the model is corrected based on the actual weights of the tiles in frame F2, as previously described. This means that, since the top-left tile now contains data simpler to encode and therefore has an actual weight of 1, the model's weight for this tile will be reduced, but only to 3.25 as the deviation from its weight in the previous frame, F1, is limited to be one quarter of its actual weight in the current frame F2.

It will be apparent that normalising an actual number of bits $R_{actual}$ generated from compression of a corresponding previous image area in a previous image frame by the actual total number of bits $R_{TOTAL}$ generated from compression of the previous image frame produces a normalised number of bits $R_{normal}$ for each image area. A normalised weight $W_N$ for each image area is determined from the normalised number of bits $R_{normal}$ for the corresponding image area in one or more previous image frames, and, for each image area, the normalised weight $W_N$ is combined with a weight $W_P$ previously used for the corresponding image area in the previous image frame so as to provide the weight $W_{current}$ to be used to determine the desired target number of bits $R_{desired}$ to be generated from compression of the corresponding image area of the current image frame. Combining the normalised weight $W_N$ with the weight $W_P$ may involve using the following equation:

$$W_{current} = m \times W_N + (1-m) \times W_P \quad (5)$$

where m is a weighting factor in the range 0 and 1 inclusive that allows the proportions of $W_N$ and $W_P$ to be adjusted.

This means that the corresponding tile in the next frame, which is not shown, will receive a lower share of the total bit budget when it is encoded. Conversely, the fourth tile from the left in the top row now contains part of the star and therefore has an actual weight of 4. The model's weight for this tile however will increase to just 1.75, in accordance with the procedure described above. The result of this procedure for calculating the weights is that what would otherwise be a sudden change in the bit allocation, and thus quality, for these two tiles is smoothed out over time.

Figure 6:
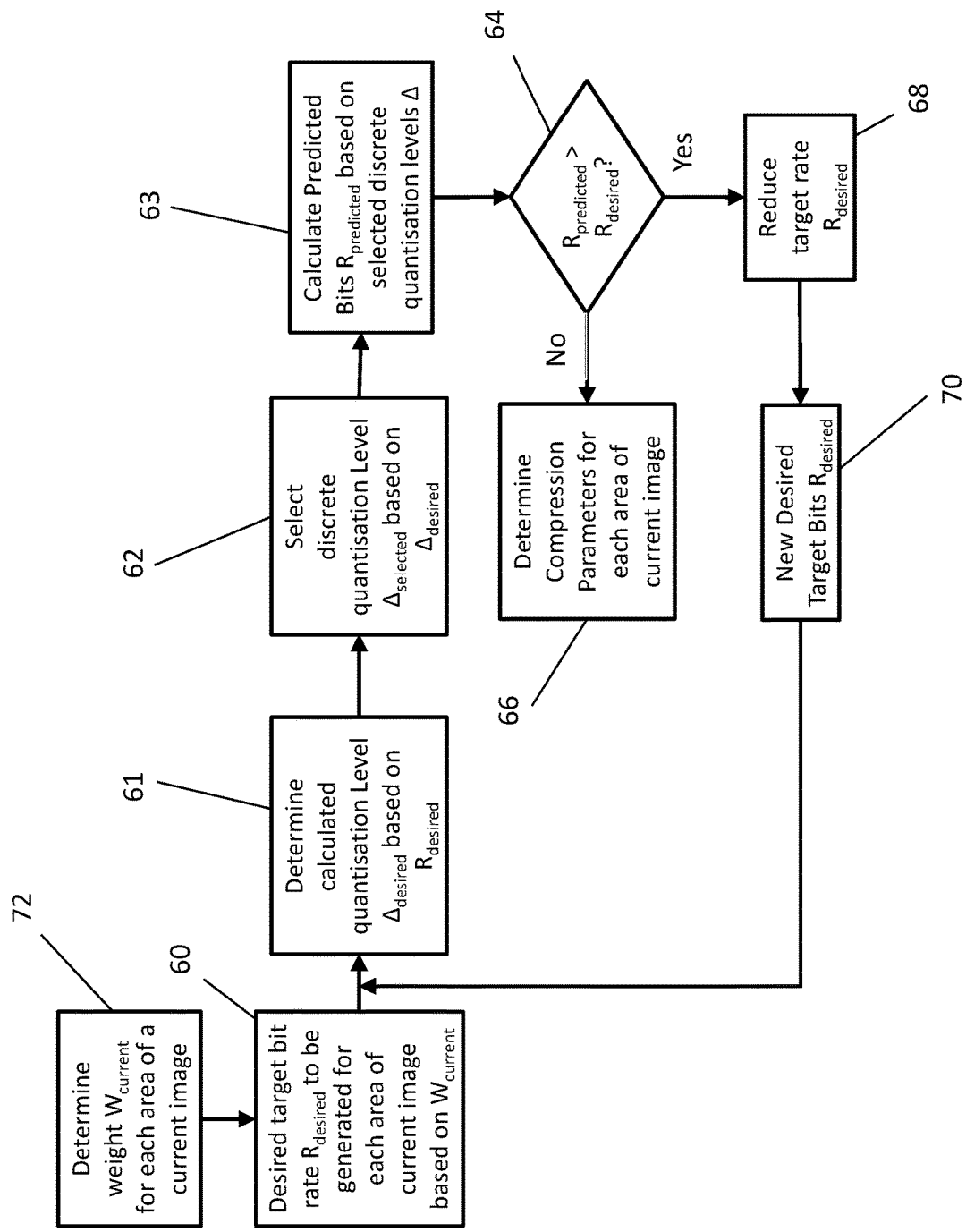
FIG. 6 is a flow diagram of a compression control method, similar to that of FIG. 3, that may be used in the process of FIGS. 4 and 5.

A flow diagram of an example method for the process described above with reference to FIGS. 4 and 5 is shown in FIG. 6. As shown, the flow chart is similar to that of FIG. 3, but without elements 52-58 being illustrated. In this case, as illustrated, an initial step of determining 72 the weight $W_{current}$ for each area of a current image is initially carried out. After this has been determined, steps 60, 61, 62, 63, 64, 66, 68 and 70 are essentially similar to steps 40, 41, 42, 43, 44, 46, 48 and 50 described above with reference to FIG. 3, but carried out on for each area of the current image. In this case, the desired target bit rate $R_{desired}$ to be generated for each area of current image is based on the weight $W_{current}$ determined for that area.

Figure 7:
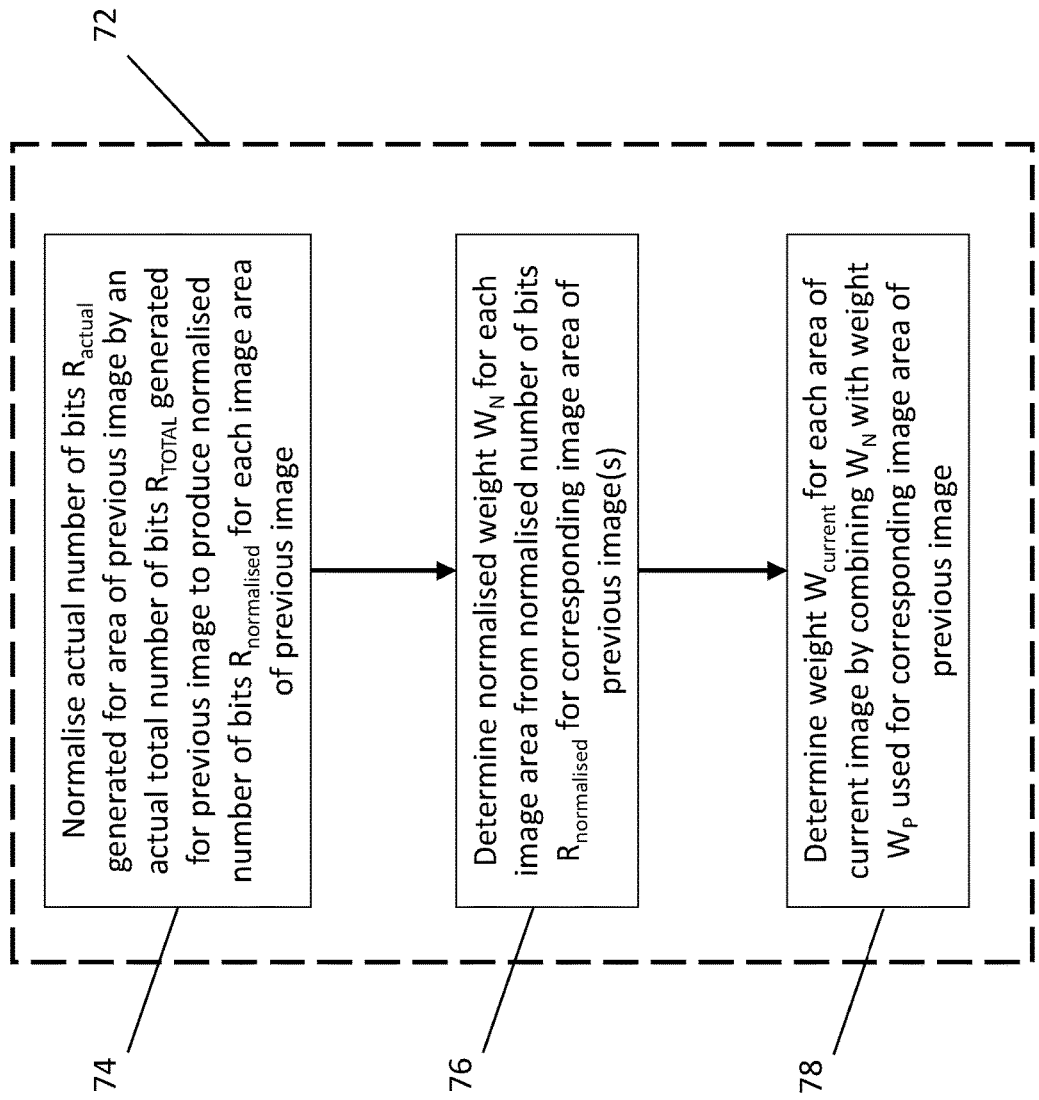
FIG. 7 is a flow diagram of part of the process of FIG. 6.

FIG. 7 illustrates the initial step 72 of determining the weight $W_{current}$ for each area of a current image in more detail. As shown, the actual number of bits $R_{actual}$ generated for each corresponding area of a previous image is first normalised 74 by an actual total number of bits $R_{TOTAL}$ generated for the previous image to produce a normalised number of bits $R_{normalised}$ for each image area of the previous image. A normalised weight $W_N$ is then determined 76 for each image area from the normalised number of bits $R_{normalised}$ for each corresponding image area of the previous image. It will be apparent that this can be done for one or more previous images. Finally, the weight $W_{current}$ for each area of the current image is determined 78 by combining $W_N$ with a weight $W_P$ used for the corresponding image area of the previous image.

In some embodiments, the target coding rate for a tile group is set on the fly and is dependent on the tile groups that have already been encoded within the frame. Given the varying statistics of image pixels across the frame, each tile group will have a different rate share allocated on the basis of how difficult it is to compress. The encoding complexity is quantified by means of a tile group weight, as described above. However, the quality controller may also use a so-called smoothing window, which enables spreading the overspending/underspending that has happened so far within the frame to the next x tile groups to be encoded. In an embodiment, the smoothing window size x may be set according to the following rule:

$$x = \begin{cases} \min(40, rTG) & \text{no parallel processing} \\ 10 & \text{parallel processing} \end{cases}$$

where rTG denotes the number of remaining tile groups to be encoded. The rate allocation and quality selection for the tile group can be specified with the following sequence of ordered steps:

1. The target frame bits for pixels associated with fixed size (i.e. uncompressible so as to have the highest quality) tile groups and a list of available qualities is stored.

2. During the encoding of a tile group the target frame bits for pixels associated with fixed size tile groups is obtained and this is where both the target coding rate and quality are set for a particular tile group. If a tile group is to be of fixed size, go to Step 3. Otherwise go to Step 4.

3. If a tile group is to be of fixed size, its quality is set to the highest quality (uncompressed) and the process is finished.

4. Else (a tile group is an updated tile group to be compressed), the target bits for the tile group is calculated as:

$$TGTargetBits = \frac{m\_targetFramesBitsUpdatePixels.TGWeight}{TotalWeightOfUpdateTGs}$$

where TGWeight denotes the encoding complexity of a tile group and TotalWeightOfUpdateTGs is the cumulative total of all weights associated with tile groups encoded.

5. The TGTargetBits is then adjusted by adding the following quantity:

$$\frac{\delta_R}{x}$$

where x is the smoothing window size defined above and $\delta_R$ denotes the amount of overspending/underspending that has happened so far in the encoding process. More precisely, $\delta_R$ will be positive in the case of underspending and negative otherwise.

6. Finally, the tile group quality QTG is determined from the target number of bits, as described above, and then rounded to the nearest quality in use in the current frame. This is simply the set of qualities found by adding some offsets to the frame quality (QF). By default, these quality offsets are (−5, 0) when the encoder operates in video mode, i.e. when higher quality is required and (−10, 0, +10) when in desktop mode. i.e. when lower quality may be possible, for example when a textual image is being viewed. The QTG is also clipped to be within the allowed range set by the encoder.

Figure 8:
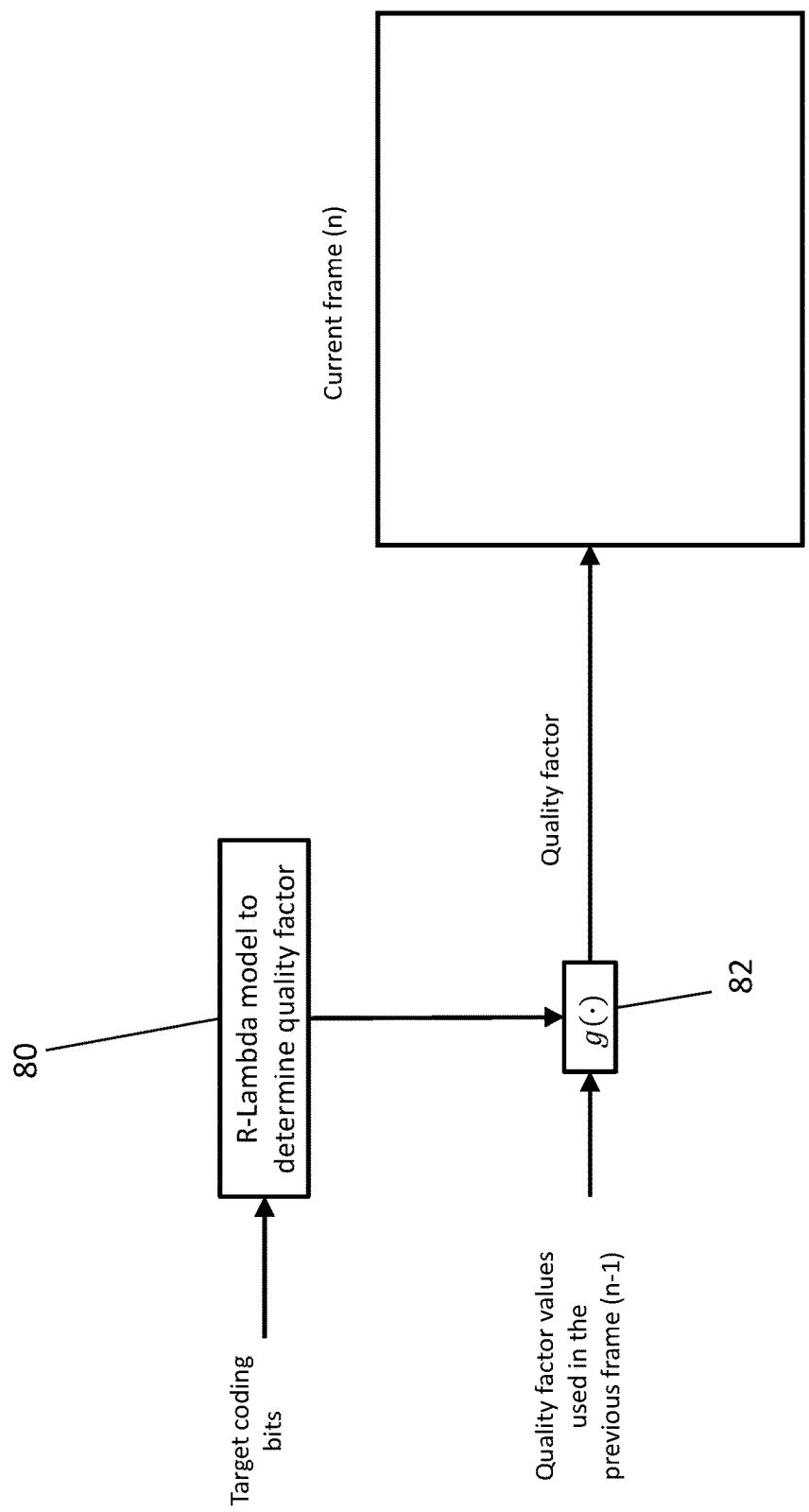
FIG. 8 shows, schematically, a further process for controlling a compression level to be used in the system of FIG. 1.

In some embodiments, as shown with reference to FIG. 8, the quality controller may determine 80 a quality factor ($Q_T$) for the entire frame which may not be representative of the compression levels used for different image areas or tile groups. The quality factor may be considered to be the compression level, as explained above, or may otherwise be determined from the compression (quantisation) level Δ, i.e. from the R–λ relation. In particular, it may happen that the distribution of the quality factors across a frame is highly skewed towards one of the boundaries of the allowed range of quality factors. In this case, the quality controller 14 may decide to use a quality factor in the next image which is similar to the one used previously, thus leading to the same skewed distribution of quality factors. The overall effect may be that the quality controller has a lower accuracy in reaching the target rate. One way to prevent this phenomenon is to adjust the quality factor of the current frame n not only based on the indication provided by the R–λ relation, but also on what happened in terms of quality factors in previous images (n−1). A set of conditions can be derived so that when they are satisfied the quality factor for the current image can change to the average quality factor measured over all image areas in the previous image. With reference to FIG. 6, a combination 82 of the quality factor for the current frame and the distribution of the factors in the previous image may be combined in a function/process.

The different conditions and the reasons for them are listed below:

smallFrameQualityChangeCondition: This condition is true when the frame quality for the upcoming frame has not changed by as large a delta as that of the delta between the previous frame quality and the average tile group quality. This is needed to ensure that the average tile group quality is only used when the frame quality isn't changing fast enough largeFrameQualityChangeCondition: This condition is true when the difference between the frame quality for the upcoming frame and the average tile group quality in the previous frame is larger than a calculated threshold. This is needed to make sure that the average tile group quality is only used when the frame quality would lead to another skewed distribution of TG qualities within the upcoming frame.

correctDirectionCondition: This condition is only true when changing to the average tile group quality would move the frame quality in the same direction as the coding rate, i.e. if an overspend occurs then the average tile group quality must be lower than the frame quality.

The smoothing window may also be in use, so that the tile groups will be able to adapt to overspending/underspending within the frame.

Figure 9B:
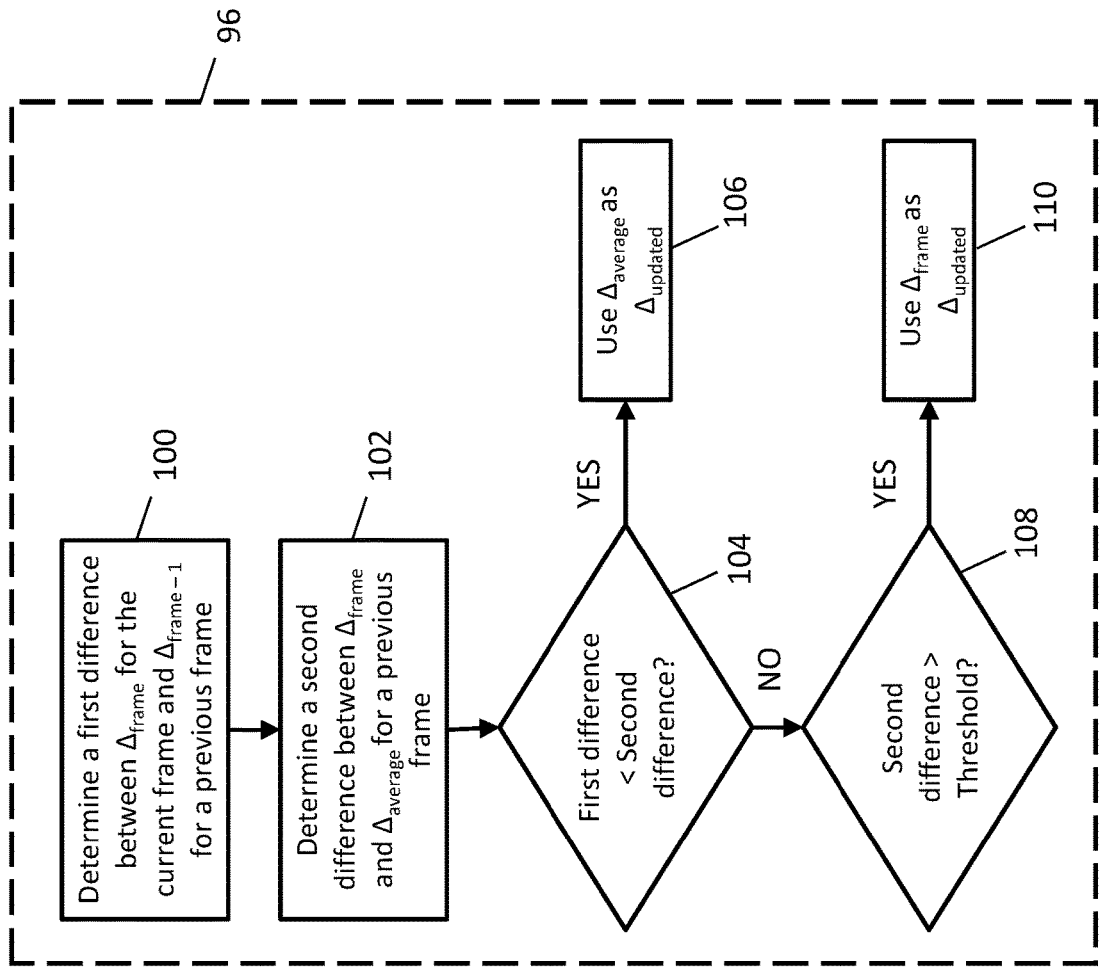
FIGS. 9*a* and 9*b* are flow diagrams of a compression control method that may be used for the process of FIG. 8.
Figure 9A:
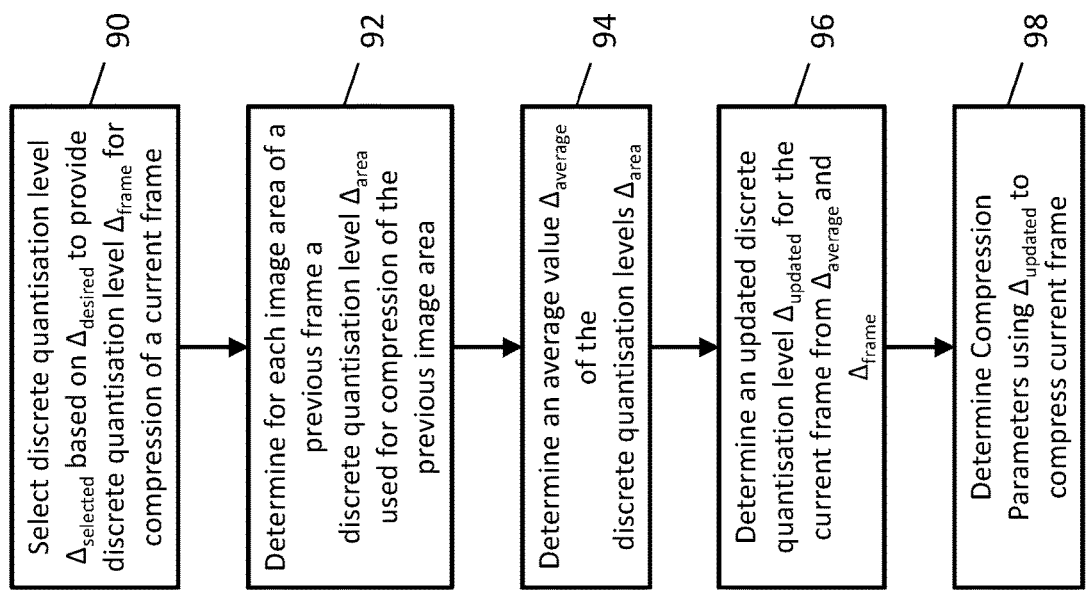

A flow diagram of an example method for the process described above with reference to FIG. 8 is shown in FIGS. 9a and 9b. FIG. 9a shows the method starting at the step 90 of selecting the discrete quantisation level $\Delta_{selected}$ based on $\Delta_{desired}$ to provide a discrete quantisation level $\Delta_{frame}$ for compression of a current frame. This may be the same step as step 42 in FIG. 3 described above. Thereafter, for each image area of a previous frame, a discrete quantisation level $\Delta_{area}$ used for compression of the previous image area is determined 92. An average value $\Delta_{average}$ of the discrete quantisation levels $\Delta_{area}$ is then determined 94, and an updated discrete quantisation level $\Delta_{updated}$ for the current frame is determined 96 from $\Delta_{average}$ and $\Delta_{frame}$. Compression parameters for compressing the current frame are then determined 98 using the updated discrete quantisation level $\Delta_{updated}$. An example process for determining the updated discrete quantisation level $\Delta_{updated}$ is shown in FIG. 9a. In this example, a first difference is determined 100 between the discrete quantisation level $\Delta_{frame}$ for the current frame and the discrete quantisation level $\Delta_{frame-1}$ for a previous frame. A second difference is determined 102 between the discrete quantisation level $\Delta_{frame}$ and the average value $\Delta_{average}$ of the discrete quantisation levels $\Delta_{area}$ for the previous frame. The first difference is compared 104 to the second difference and if the first difference is determined to be smaller than the second difference, then the average value $\Delta_{average}$ of the discrete quantisation levels $\Delta_{area}$ for the previous frame is used as the updated discrete quantisation level $\Delta_{updated}$ (Step 106). If not, the second difference is compared 108 to a threshold value, and, if it is determined that the second difference is higher than the threshold value, the discrete quantisation level $\Delta_{frame}$ for the current frame is used as the updated discrete quantisation level $\Delta_{updated}$ (Step 110).

Figure 10:
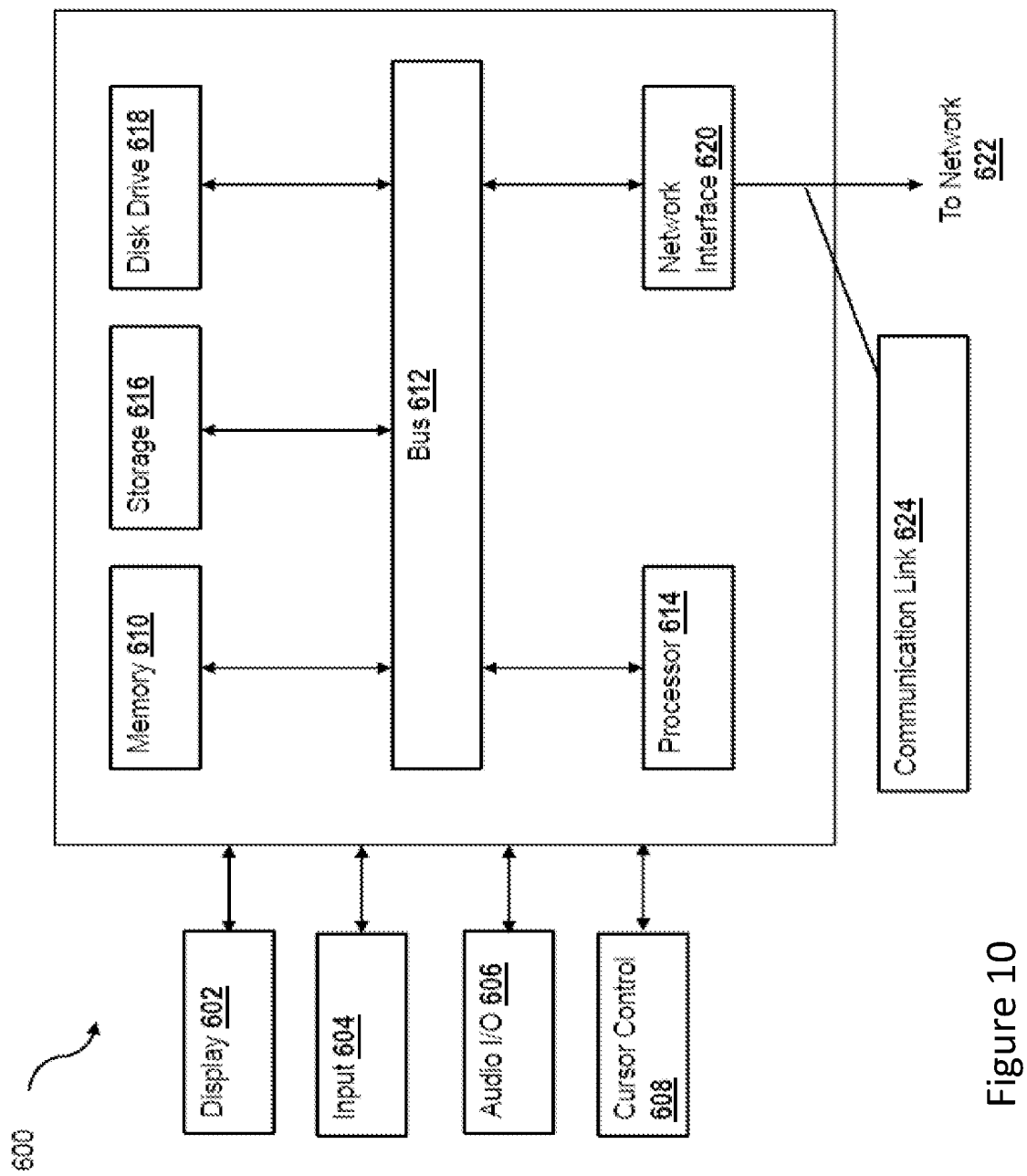
FIG. 10 illustrates a block diagram of an exemplary computer system.

FIG. 10 is a block diagram of a computer system 600 suitable for implementing one or more embodiments of the present disclosure, including the host device 10 or the client device 18. In various implementations, the host device 10 may include a personal computer (PC), laptop, etc. adapted for wireless or wired communication, and each of the host device 10 or the client device 18 may include a network computing device. Thus, it should be appreciated that these devices 10, 18 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user action, such as selecting keys from a keypad/keyboard, selecting one or more buttons or links, etc., and sends a corresponding signal to the bus 612. The I/O component 604 may also include an output component, such as a display 602 (which may, in some embodiments, be the display 20) and a cursor control 608 (such as a keyboard, keypad, mouse, etc.). An optional audio input/output component 606 may also be included to allow a user to use voice for inputting information by converting audio signals. The audio 1/O component 606 may allow the user to hear audio. A transceiver or network interface 620 transmits and receives signals between the computer system 600 and other devices via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices and may, in some embodiments, be the processor that executes the application 12.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 could be utilised to perform the compression (encoding) and transmission functions of the host device 10, or the receiving and decompression (decoding) functions of the client device 18.

Executable logic for performing any described functions may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method of controlling compression of image data, the method comprising, by a quality controller:
    obtaining a desired target number of bits to be generated from compression of a current image area using a predetermined compression protocol;
    determining a calculated quantisation level based on the desired target number of bits using a predetermined relationship between a number of bits to be generated from compression and a quantisation level; and
    selecting a discrete quantisation level from a plurality of predetermined discrete quantisation levels based on the calculated quantisation level;
    determining a predicted number of bits that would result from compression of the current image area at the selected discrete quantisation level using the predetermined relationship between the number of bits to be generated from compression and the quantisation level;
    determining whether the predicted number of bits exceeds the desired target number of bits; and
    in response to the predicted number of bits not exceeding the desired target number of bits, providing to an encoder information to enable the encoder to determine a set of compression parameters associated with the selected discrete quantisation level;
    wherein determining the calculated quantisation level based on the desired target number of bits using the predetermined relationship between the number of bits to be generated from compression and the quantisation level comprises:
    computing a Lagrange multiplier $\lambda$ from $\lambda = \alpha \cdot \beta \cdot 2^{\beta \cdot R}$, where R is the desired target number of bits, and $\alpha$ and $\beta$ are variables depending on the predetermined compression protocol and the image data to be compressed; and
    computing the calculated quantisation level $\Delta$ from $\Delta = a \cdot \lambda^b + c$, where $\lambda$ is the Lagrange multiplier, and a, b and c are experimental values determined for the predetermined compression protocol.

2. The method of claim 1, further comprising, in response to the predicted number of bits exceeding the desired target number of bits:
    reducing the desired target number of bits; and
    redetermining the predicted number of bits that would result from compression of the current image area based at least in part on the reduced desired target number of bits.

3. The method of claim 1, wherein determining the predicted number of bits comprises:
    determining an actual number of bits resulting from compression of a predetermined number of previous corresponding image areas;
    determining a difference between the actual number of bits and the desired target number of bits previously set for the predetermined number of previous corresponding image areas; and
    combining the difference with the predicted number of bits to produce an updated predicted number of bits; and
    wherein determining whether the predicted number of bits exceeds the desired target number of bits is carried out on the updated predicted number of bits.

4. The method of claim 1, wherein selecting the discrete quantisation level from the plurality of predetermined discrete quantisation levels based on the calculated quantisation level comprises selecting the discrete quantisation level that has a nearest value to the calculated quantisation level from the plurality of predetermined discrete quantisation levels.

5. The method of claim 1, wherein the information to enable the encoder to determine the set of compression parameters associated with the selected discrete quantisation level comprises a mapping index quality factor, and the method further comprises:
    determining the mapping index quality factor corresponding to the selected discrete quantisation level from a mapping of mapping index quality factors to quantisation levels; and
    providing the determined mapping index quality factor to the encoder to enable the encoder to determine the selected discrete quantisation level corresponding to the determined mapping index quality factor from a mapping of quantisation levels to mapping index quality factors in the encoder, and to determine the compression parameters for the corresponding selected discrete quantisation level from a mapping of quantisation levels $\Delta$ to compression parameters in the encoder.

6. The method of claim 1, wherein obtaining the desired target number of bits to be generated from compression of a current image area comprises:
    determining a bandwidth available for transmission of the compressed image data of an image frame and an available number of bits that can be transmitted over the available bandwidth;
    determining a compulsory number of bits that are compulsory for transmission of the compressed image data of the image frame; and
    subtracting the compulsory number of bits from the available number of bits to determine the desired target number of bits.

7. A non-transitory computer-readable storage medium storing instructions for execution by one or more processors of a quality controller, wherein execution of the instructions causes the quality controller to control compression of image data by performing operations comprising:
    obtaining a desired target number of bits to be generated from compression of a current image area using a predetermined compression protocol;
    determining a calculated quantisation level based on the desired target number of bits using a predetermined relationship between a number of bits to be generated from compression and a quantisation level; and
    selecting a discrete quantisation level from a plurality of predetermined discrete quantisation levels based on the calculated quantisation level;
    determining a predicted number of bits that would result from compression of the current image area at the selected discrete quantisation level using the predetermined relationship between the number of bits to be generated from compression and the quantisation level;
    determining whether the predicted number of bits exceeds the desired target number of bits; and
    in response to the predicted number of bits not exceeding the desired target number of bits, providing to an encoder information to enable the encoder to determine a set of compression parameters associated with the selected discrete quantisation level;
    wherein determining the calculated quantisation level based on the desired target number of bits using the predetermined relationship between the number of bits to be generated from compression and the quantisation level comprises:
computing a Lagrange multiplier $\lambda$ from $\Delta = \alpha \cdot \beta \cdot 2^{\beta \cdot R}$, where R is the desired target number of bits, and $\alpha$ and $\beta$ are variables depending on the predetermined compression protocol and the image data to be compressed; and
computing the calculated quantisation level $\Delta$ from $\Delta = a \cdot \lambda^b + c$, where $\lambda$ is the Lagrange multiplier, and a, b and c are experimental values determined for the predetermined compression protocol.

8. The non-transitory computer-readable storage medium of claim 7, wherein execution of the instructions causes the quality controller to perform operations further comprising, in response to the predicted number of bits exceeding the desired target number of bits:
reducing the desired target number of bits; and
redetermining the predicted number of bits that would result from compression of the current image area based at least in part on the reduced desired target number of bits.

9. The non-transitory computer-readable storage medium of claim 7, wherein execution of the instructions for determining the predicted number of bits causes the quality controller to perform operations further comprising:
determining an actual number of bits resulting from compression of a predetermined number of previous corresponding image areas;
determining a difference between the actual number of bits and the desired target number of bits previously set for the predetermined number of previous corresponding image areas; and
combining the difference with the predicted number of bits to produce an updated predicted number of bits; and
wherein determining whether the predicted number of bits exceeds the desired target number of bits is carried out on the updated predicted number of bits.

10. The non-transitory computer-readable storage medium of claim 7, wherein selecting the discrete quantisation level from the plurality of predetermined discrete quantisation levels based on the calculated quantisation level comprises selecting the discrete quantisation level that has a nearest value to the calculated quantisation level from the plurality of predetermined discrete quantisation levels.

11. The non-transitory computer-readable storage medium of claim 7, wherein the information to enable the encoder to determine the set of compression parameters associated with the selected discrete quantisation level comprises a mapping index quality factor, and execution of the instructions causes the quality controller to perform operations further comprising:
determining the mapping index quality factor corresponding to the selected discrete quantisation level from a mapping of mapping index quality factors to quantisation levels; and
providing the determined mapping index quality factor to the encoder to enable the encoder to determine the selected discrete quantisation level corresponding to the determined mapping index quality factor from a mapping of quantisation levels to mapping index quality factors in the encoder, and to determine the compression parameters for the corresponding selected discrete quantisation level from a mapping of quantisation levels $\Delta$ to compression parameters in the encoder.

12. The non-transitory computer-readable storage medium of claim 7, wherein execution of the instructions for obtaining the desired target number of bits to be generated from compression of a current image area causes the quality controller to perform operations further comprising:
determining a bandwidth available for transmission of the compressed image data of an image frame and an available number of bits that can be transmitted over the available bandwidth;
determining a compulsory number of bits that are compulsory for transmission of the compressed image data of the image frame; and
subtracting the compulsory number of bits from the available number of bits to determine the desired target number of bits.

* * * * *